March 15, 1938.  G. GORTON ET AL  2,110,873
ENGRAVING MACHINE
Filed Aug. 31, 1936  7 Sheets-Sheet 4
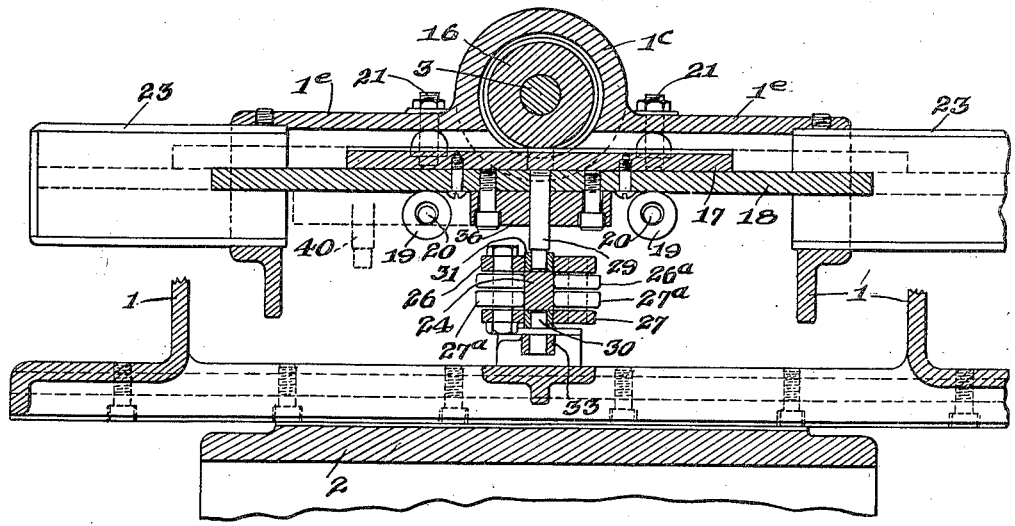
Fig. 4.
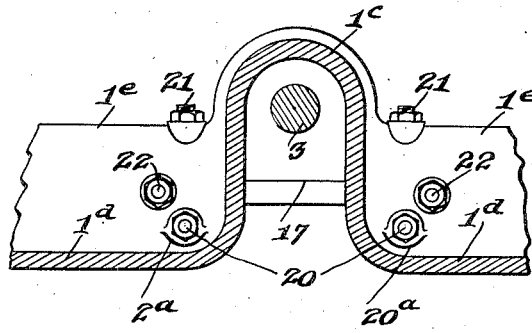
Fig. 5.
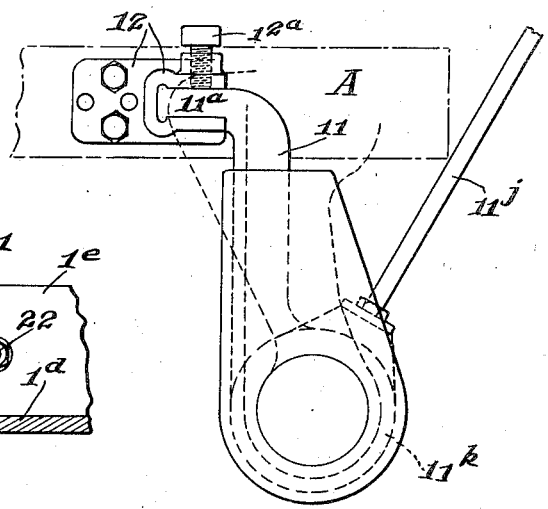
Fig. 5ª.
Inventors
George Gorton
P. M. Henkes
Fred Steinbrecker
By Peck & Peck Attorneys

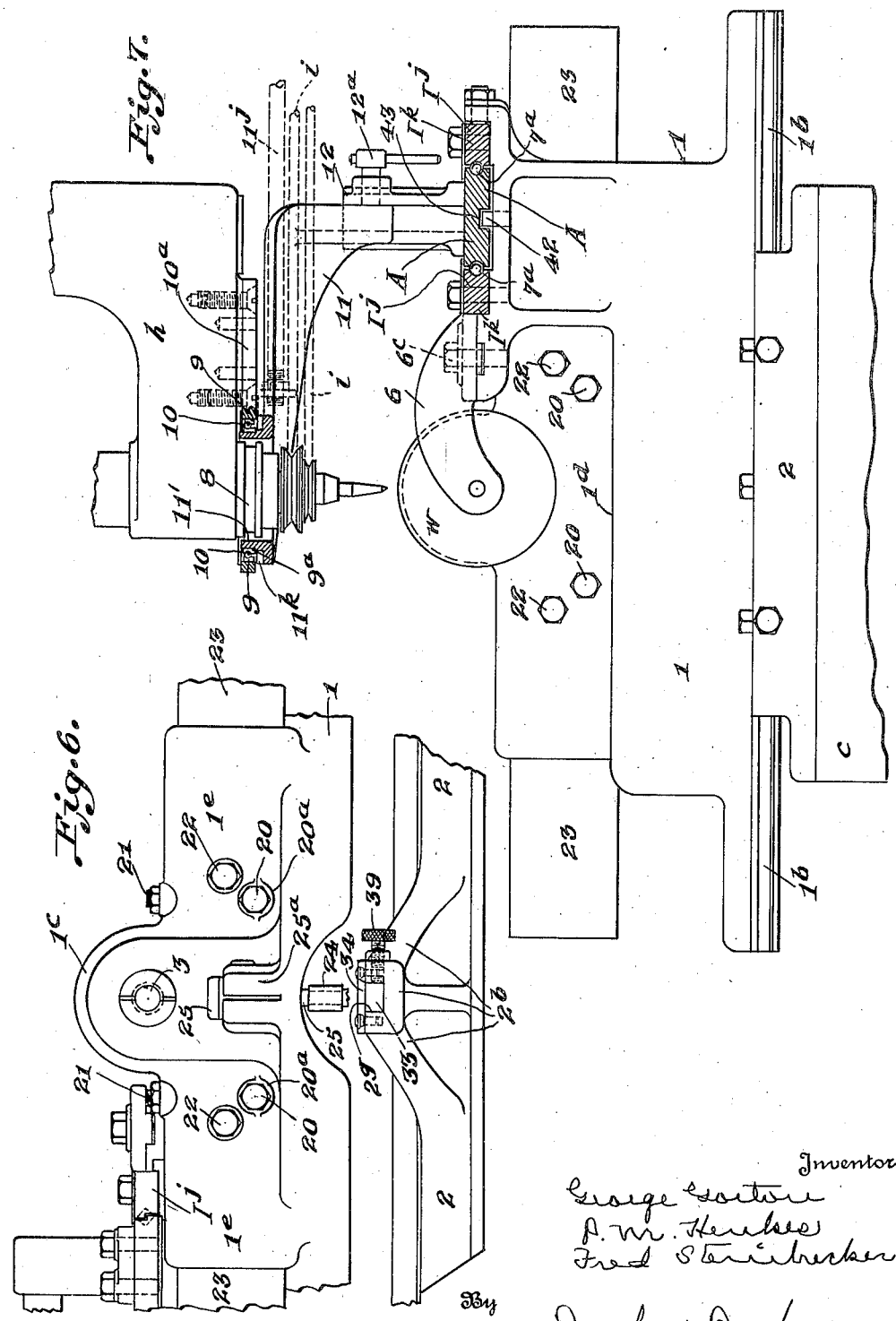

March 15, 1938.  G. GORTON ET AL  2,110,873
ENGRAVING MACHINE
Filed Aug. 31, 1936  7 Sheets-Sheet 6
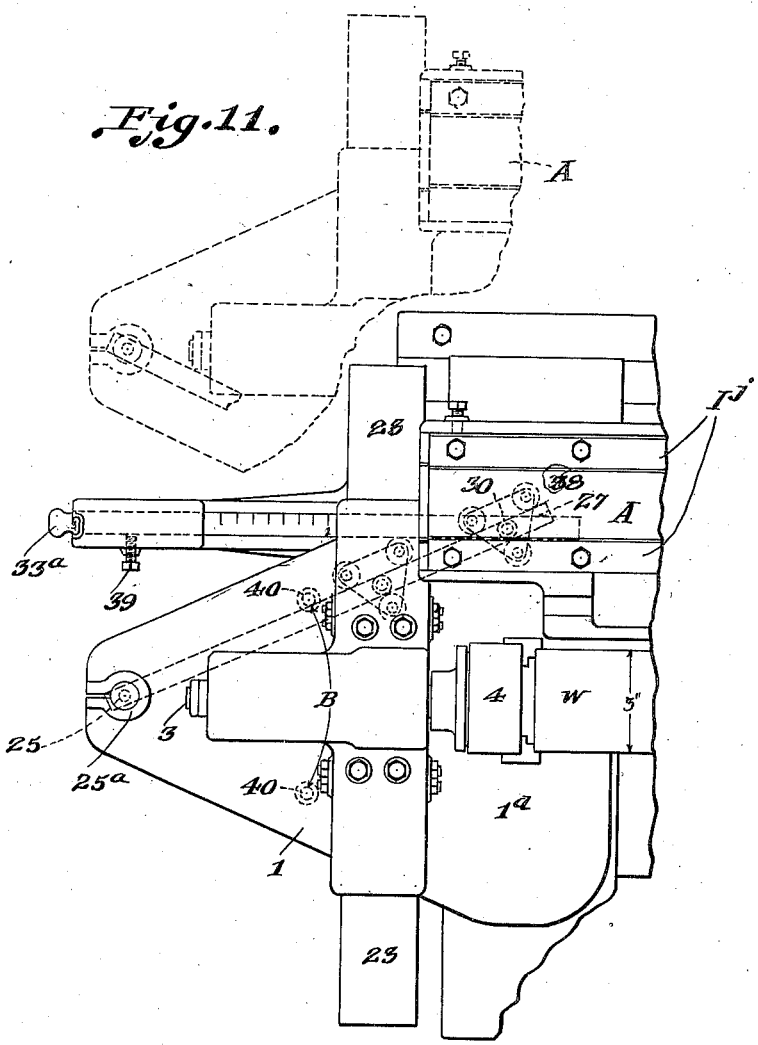
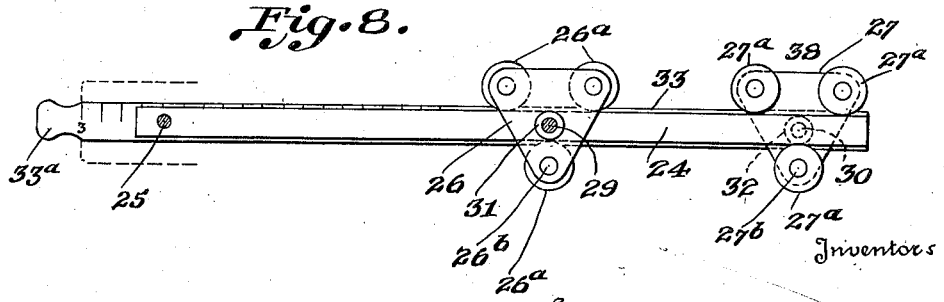

March 15, 1938.　　　G. GORTON ET AL　　　2,110,873
ENGRAVING MACHINE
Filed Aug. 31, 1936　　　7 Sheets-Sheet 7

Patented Mar. 15, 1938

2,110,873

UNITED STATES PATENT OFFICE 2,110,873

ENGRAVING MACHINE

George Gorton, Peter M. Henkes, and Fred Steinbrecker, Racine, Wis., assignors to George Gorton Machine Co., Racine, Wis., a corporation of New Jersey Application August 31, 1936, Serial No. 98,832

35 Claims. (Cl. 90—13.4)

This invention relates to engraving machines, particularly to that type designed for cutting designs or indicia on the circumferential surfaces of cylinders or other rolls; and the objects and nature of the invention will be understood by those skilled in the art, in the light of the following explanations of the accompanying drawings disclosing what we now believe to be the preferred mechanical expression or embodiment of the invention from among other forms, arrangements, constructions, modifications, and departures within the spirit and scope of this invention.

Pantograph engraving machines are now on the market capable of heavy cutting in hard material cylinders or rolls, with work holding and actuating means embodying racks and pinions, requiring the diameter of the pinion to be that of the rounded or cylindrical work, and these machines are rendered capable of operating on cylindrical work pieces of different diameters, from the small minimum diameter to the large maximum diameter, by providing for pinion removal, and replacement by a pinion of the same pitch diameter as the external diameter of each work piece to be operated on. This pinion change is a time consuming and expensive operation in view of the number of different reserve pinions required, and the difficulty of always having on hand a pinion of the exact diameter required.

There is another type of roll engraving machine of the pantograph type, on the market, wherein the desired sensitive hand-controlled action is attained, and the necessity of changing gears or pinions for each change of work diameter, is avoided, but this last named machine is not adapted for heavy cutting in hard work, such as steel rolls, or to operate on other than light-weight small-diameter work. In this last named machine, the cutter head carrying the rotary driven cutter, is universally movable with, or carried by, the pantograph, and a work carriage is provided that is movable back and forth in a straight line perpendicular to the longitudinal axis of the work. The carriage holds the light small work and transports the same when traveling along said straight line and at the same time causes rotation of the work while being so transported. The cutter head or pantograph is operatively coupled to said carriage to propel the carriage on its straight line movements, when the cutter moves laterally in directions transversely of the work axis, and to move independently of the carriage when the cutter moves longitudinally of the work then held at rest in the carriage. The carriage provides a work holder into which any diameter small light work, within limits, can be fitted, embodying a pair of adjacent parallel friction-surfaced rollers resting on a fixed track, which causes rotation of the rollers when the carriage travels on its straight line movement.

It is an object of our invention to provide a pantograph engraving machine adapted for heavy as well as light cutting in steel and other hard rolls or cylinders, of a capacity to handle and operate on such cylindrical or rounded work pieces ranging from a small diameter to a comparatively large diameter, without the necessity of changing gears or pinions, for each change in work diameter, all with increased accuracy and efficiency.

It is also an object of the invention, to provide a work carriage movable back and forth, and operatively associated with a laterally movable cutter head and a pantograph, with a rotary work holder of a capacity to hold rounded or cylindrical work pieces varying in diameter from a small diameter minimum to a large diameter maximum, and a rack and pinion mechanism for rotating the holder and work during carriage movement, with adjusting means adapting the rack and pinion mechanism to proper operation with work of any diameter within said minimum and maximum limits, without gear or pinion replacement.

A further object of the invention is to provide, in a machine for engraving around the circumference of work, a rotary holder for roll-like work pieces, adaptable for selectively holding work pieces of various diameters, for rotating such work piece on its longitudinal axis with the circumferential surface in operative relation to the engraving tool arranged radially with respect to the work, with power transmission mechanism actuated by straight line movements imparted by a pantograph, for rotating such holder and its piece of work through a complete revolution of the work for engraving completely around the circumference of the work, with the linear speed of travel of the work circumferential surface and the linear length of said surface travel, equal to the linear length and linear speed of the straight line impelling pantograph movement regardless of any difference that may exist between the diameter of the particular work piece, and the pitch diameter of the circular member concentric with and rotating the work holder, and to provide said mechanism with ratio compensating differential means adjustable and settable according to the particular work piece diameter, to compensate for the difference between such work diameter and the pitch diameter of the circular work holder rotating member.

Another object of the invention is to provide certain improvements in such pantograph engraving machines, leading to the attainment of increased sensitive action under the control of a hand-operated pantograph.

And a further object of the invention is to provide certain improvements in features, structures, and combinations, with the end in view of gaining advantages and increased efficiency and usefulness.

The invention consists in certain novel features in structure, combinations, arrangements, and details, as more fully explained and specified hereinafter.

Referring to the accompanying drawings, forming a part hereof:—

Fig. 1 shows a pantograph engraving machine in side elevation more or less diagrammatically, including therein an embodiment of our invention, also showing a roll-like work piece held by the chuck of the rotary work holder.

Fig. 2 is a detailed top elevation of the work holder carriage disclosed by Fig. 1, the connection between the transverse elevated slide of the carriage, and the cutter head being omitted, a work piece not being shown, various positions of the operative connection between the rack and the laterally swingable lever being indicated by dotted lines, the lever fulcrum shifting and setting bar is shown partially pulled out but not indicating any particular operative fulcrum adjustment, the swingable lever is shown by dotted lines in its inclined position at one end of its arc of relative movement, to which swung from its central position shown by dotted lines "C", by travel of the carriage from "C" to the position wherein it is shown by full lines.

Fig. 3a shows the work holder carriage in front elevation.

Fig. 4 is a vertical section taken longitudinally of the work carriage on the line 4—4, Fig. 2.

Fig. 5 is a detailed vertical section on the line 5—5, Fig. 2.

Fig. 5a is a detailed diagrammatic top plan of the connection between the transverse slide and the cutter head, in part.

Fig. 6 is a detailed side elevation of the work carriage and its support taken from the left hand end, Fig. 2.

Fig. 7 is a more or less diagrammatic sectional elevation looking at the work carriage and its support from the right of Fig. 2 and showing in part the cutter head and its support and the operative connection between the cutter head and the transverse slide of the work carriage.

Fig. 8 is a diagrammatic top plan view of the laterally swingable lever transmission mechanism for operating a rack and pinion, showing in part the lever fulcrum supporting and adjusting bar and the slide connection between the lever and the rack and between the lever and the lever fulcrum bar, the lever fulcrum being in the adjustment 38, say as shown by Fig. 11 for operating on say 3 inch diameter work.

Figure 9:
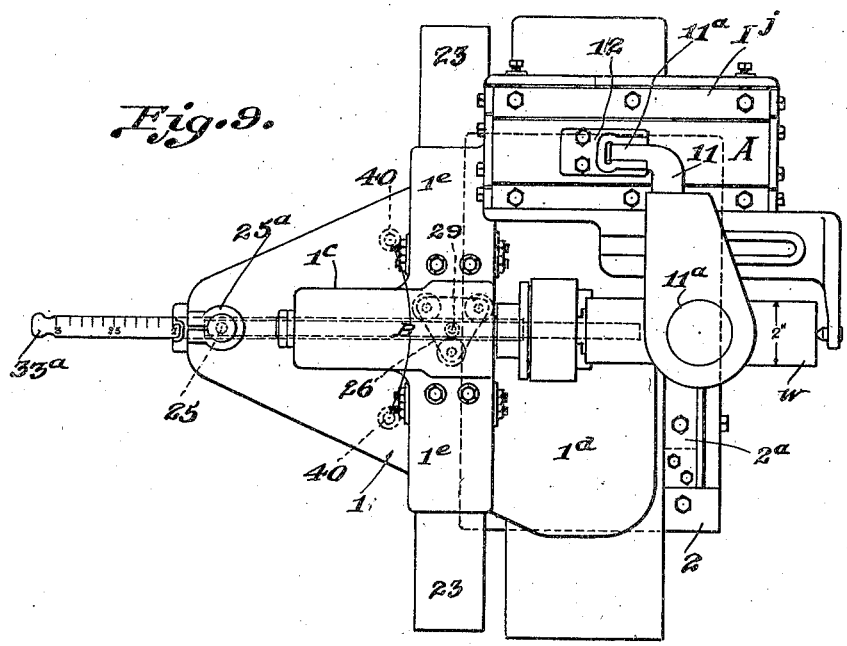

Fig. 9 is a detailed top plan of the work carriage and its support, the cutter head and part of its connection with the transverse slide of the carriage being omitted, a work piece of 2 inch diameter being shown in the holder with the lever and the slides thereon adjusted, say to operate on 2 inch diameter work.

Figure 10:
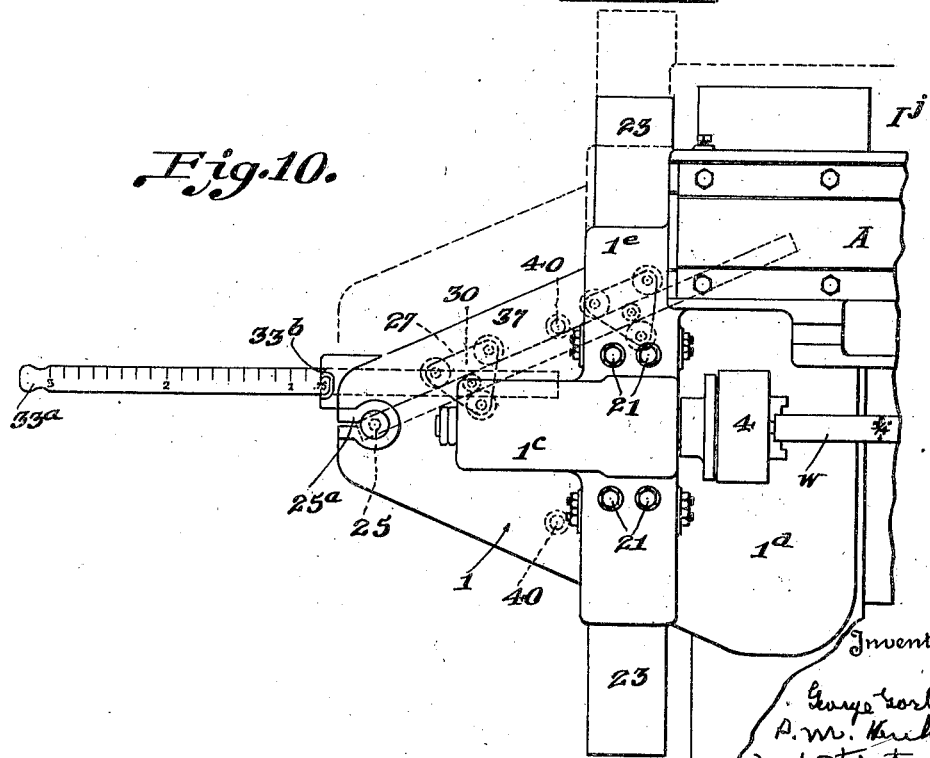

Fig. 10 is a diagrammatic top plan of the work carriage and certain cooperating parts, showing a work piece in the work holder of ¾ inch diameter with the lever fulcrum controlling means adjusted for operation on a work piece of such diameter, dotted lines indicating various positions of the parts, with the carriage moved from the dotted line position to the full line position to cause a full revolution of the ¾ inch work piece.

Fig. 11 is a more or less diagrammatic plan of the work carriage and certain associated parts, a 3 inch diameter work piece being shown in the rotary work holder and the work carriage being shown by full and dotted lines to indicate a full stroke travel thereof to cause a complete revolution of the 3 inch diameter work piece.

From the specific standpoint, our invention generally concerns a work holder for the roll-like or cylindrical work adapted to clamp or otherwise hold the work against relative movement, and to rotate the work on its longitudinal axis, combined with a work carriage in which said holder is mounted for relative rotation and by which said holder is supported and transported. This carriage is mounted and confined to travel in either direction in a straight line that is perpendicular to the longitudinal axis on which said holder and the work is rotatable. The work holder is of a capacity to releasably receive and rigidly hold any one of a series of rounded or roll-like work pieces running in diameter from a minimum to a maximum, say from rolls three-fourths of an inch in external diameter more or less, to rolls, say three inches in diameter more or less. The organization provides means or mechanism for converting rectilinear movements into rotary movements, whereby as the carriage travels on its straight line path the work holder will be transported thereby and rotated as the carriage advances in either direction. Said means for converting the rectilinear movement of the carriage into the rotary movement of the work, includes a ratio compensating differential device that is adjustable or settable to accord with the exterior diameter of any particular round work piece, within the capacity of the particular organization, to maintain the linear travel of the circumferential surface of the rotating work at the same speed, and reproduction ratio or length as the linear speed and reproduction ratio or length of the straight line travel of the pantograph-impelled work carriage.

Thus, for example, where the mechanism for changing the rectilinear travel of the work carriage into the rotary movement of the work holder mounted in and transported by the carriage, includes a rack and geared pinion, relatively movable to cause the work holder rotation; we show, in the particular embodiment illustrated, a pinion of a pitch diameter less than that of the maximum diameter work, and greater than that of the minimum diameter work, within the capacity of the machine. We avoid the necessity of replacement of this pinion, whenever the machine is to operate on work of a different exterior diameter than that of the pitch diameter of the pinion, by the provision of an operative mechanism or connection between the rack, carriage, and a machine part fixed with respect to the carriage, whereby work holder rotation results from relative movements between the rack and pinion and the carriage and said fixed part, and by rendering this operative connection manually adjustable or settable to maintain the desired ratio between the linear travel of the carriage and the linear travel of the circumferential surface of the rotating work. In other words, ratio compensating differential mechanism is provided for controlling the operative transmission that converts the rectilinear scaled movements of the pantograph into the rotary movements of the work and such ratio compensating differential mechanism is adjustable and settable to compensate for the difference between the pitch diameter of the pinion and the diameter of any rounded work piece within the capacity of the machine, to thereby maintain the reproduction ratio of the linear surface travel of the rotating work for engraving completely around the same, the same as where the pinion pitch diameter equals the work diameter.

In a preferred organization of our invention, the work carriage is operatively associated with and coupled to a cutter head that includes a rotary driven engraving or other suitable cutter, with the cutter head associated with the pantograph and universally laterally movable thereby as the stylus carried by the pantograph is moved by the hand of the operator to trace the flat copy or pattern to be reproduced, usually in scaled relation, by the engraving tool in the circumferential surface of the work. The arrangement of the operative connection between the cutter head and the work carriage, is preferably such that movements of the cutter head that are longitudinal with respect to the work produce no carriage movements, while lateral movements of the cutter head that are transverse with respect to the work axis cause corresponding scaled straight line movements of the carriage, and consequent rotation of the work. The operative connection between the work carriage and the cutter head is preferably such as to constantly maintain the longitudinal axis of the engraving tool or cutter perpendicular to and in the same vertical plane as the longitudinal axis of the work.

Our invention, while preferably associated with a pantograph engraving machine as above outlined, can be adapted to other forms and arrangements of reproducing engraving machinery wherein possibly the movements of a cutter head are controlled automatically by power or other operative mechanism as we do not wish to limit all features of our invention to operative association with a pantograph controlled cutter head.

Our invention can be built into a reproducing engraving machine of the pantograph or other type, all as specifically disclosed herein; or can be manufactured as an attachable unit for application to and removal from plane surface or other types of pantograph engraving machines.

In the specific embodiment illustrated, we disclose the work carriage and holder organized as an attachable unit, applied to an ordinary type of pantograph engraving machine more or less diagrammatically illustrated.

This engraving machine embodies a column $a$, of any suitable structure and formation provided with any suitable knee $b$, usually vertically adjustable on the column $a$, and provided with a top work table $c$, usually provided with suitable means for adjusting the same longitudinally as well as forwardly and rearwardly on the knee.

This column $a$, is shown provided with a horizontal flat pattern or copy holder $d$, on which the flat copy is clamped or otherwise fixed.

Any suitable pantograph $e$, usually of the parallelogram jointed link type, is carried by the upper part of the column $a$, to swing on the vertical pantograph axis $f$. This pantograph provides a stylus arm carrying any suitable stylus $g$, for tracing the copy on the copy holder $d$, under the control and actuation of the hand of the operator. In this example, we show the cutter head 8, supported for universal horizontal lateral movement through the medium of suitable linkage $h$, hinged to the upper portion of the column $a$, with the cutter head controlled and actuated in its universal lateral movements by the pantograph $e$, through the medium of a vertical pivotal connection $e'$.

The cutter head carries the cutter spindle that is adapted to replaceably receive and operate the rotary engraving tool or cutter 14, and this spindle is preferably driven by a suitably controlled and actuated belt drive $i$.

Figure 1:
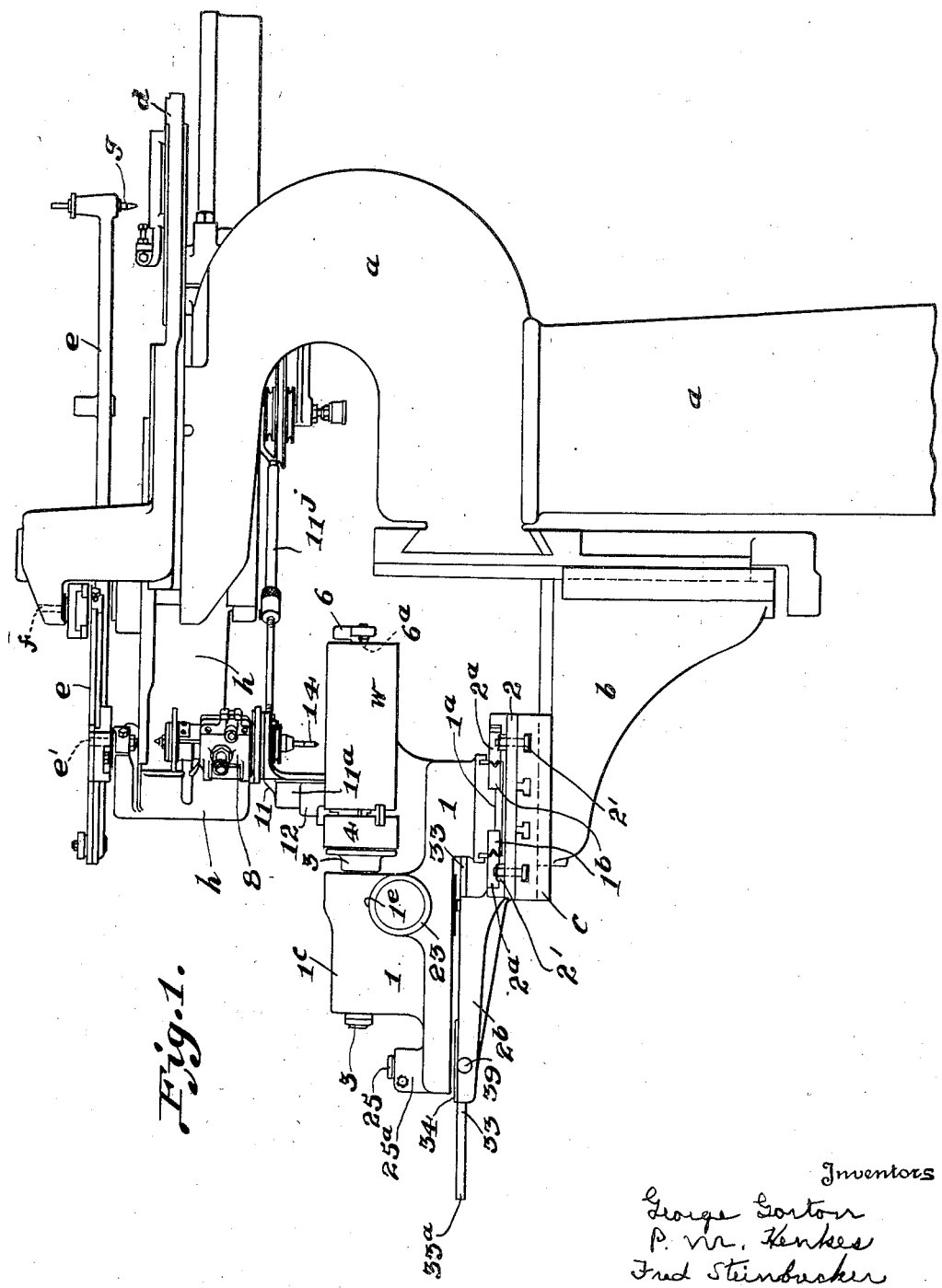

In the example illustrated, the attachment that includes the embodiment of our invention provides a base or supporting bed 2, that rests on and is detachably clamped to the work table $c$ in any suitable manner, as by clamping bolts and nuts 2', as generally indicated by Fig. 1 of the drawings.

The work carriage generally identified by the reference numeral 1, is supported by the bed 2, and is confined to this bed to a straight line path of movement in either direction, in a normally fixed horizontal plane, by any suitable supporting, controlling and guiding means as between the bed and the carriage.

This carriage supports and transports the rotary work holder that includes in this embodiment the spindle 3, the work holding chuck 4, and the pinion or gear 16; also the geared straight line rack 17, in mesh with the gear 16, and the rack supporting and guiding means. The longitudinal axis of the rack 17, is parallel with the straight line path of movement of the carriage 1.

This carriage 1 also supports and transports a transversely arranged member or slide A, by which the carriage is propelled on its straight line movements, and is held at any position within its said path, through the medium of the pantograph with which said slide A, is operatively connected, as more fully hereinafter explained.

In this embodiment illustrated, without intending to so limit our invention, the slide A, is arranged in a horizontal elevated position on horizontal transverse elevated deck 1$j$, at the inner end of the carriage 1, that is, at the end of the carriage 1 adjacent the cutter head 8. This relatively narrow longitudinaly elongated slide A is mounted on the carriage 1, by any desirable suitable means to confine said slide to free straight line longitudinal reciprocation in a normally fixed horizontal plane, relatively to the carriage, with the longitudinal axis of said slide A, perpendicular to the straight line path of movement of the carriage. While the slide A, is freely movable longitudinally relatively to the carriage, said slide is held to the carriage against relative lateral movement in such manner that push and pull movements applied to the slide A, laterally with respect to its longitudinal axis, will impel the carriage on its straight line movements without relative lateral movements between the slide and carriage. Impelling movements applied to the slide A, longitudinally thereof will cause straight line longitudinal movement of the slide with respect to the carriage, the carriage then remaining at rest.

Without desiring to so limit all features of our invention, the carriage 1, in the embodiment illustrated, includes a main frame in the form of what might be termed an inverted hollow dished housing, approximately closed at the top and edges and open at the bottom.

In this example, we show the rigid housing or case 1, formed with a bottom or depressed supporting base 1a, extending from front to rear, or longitudinally, of the carriage and arranged horizontally, and to one side of the vertical plane of the longitudinal axis of the carriage, in this instance to the right-hand side of said plane, and this base forms an integral or a rigid part of the housing 1, and of the adjacent vertical edge walls of said housing.

Figure 3:
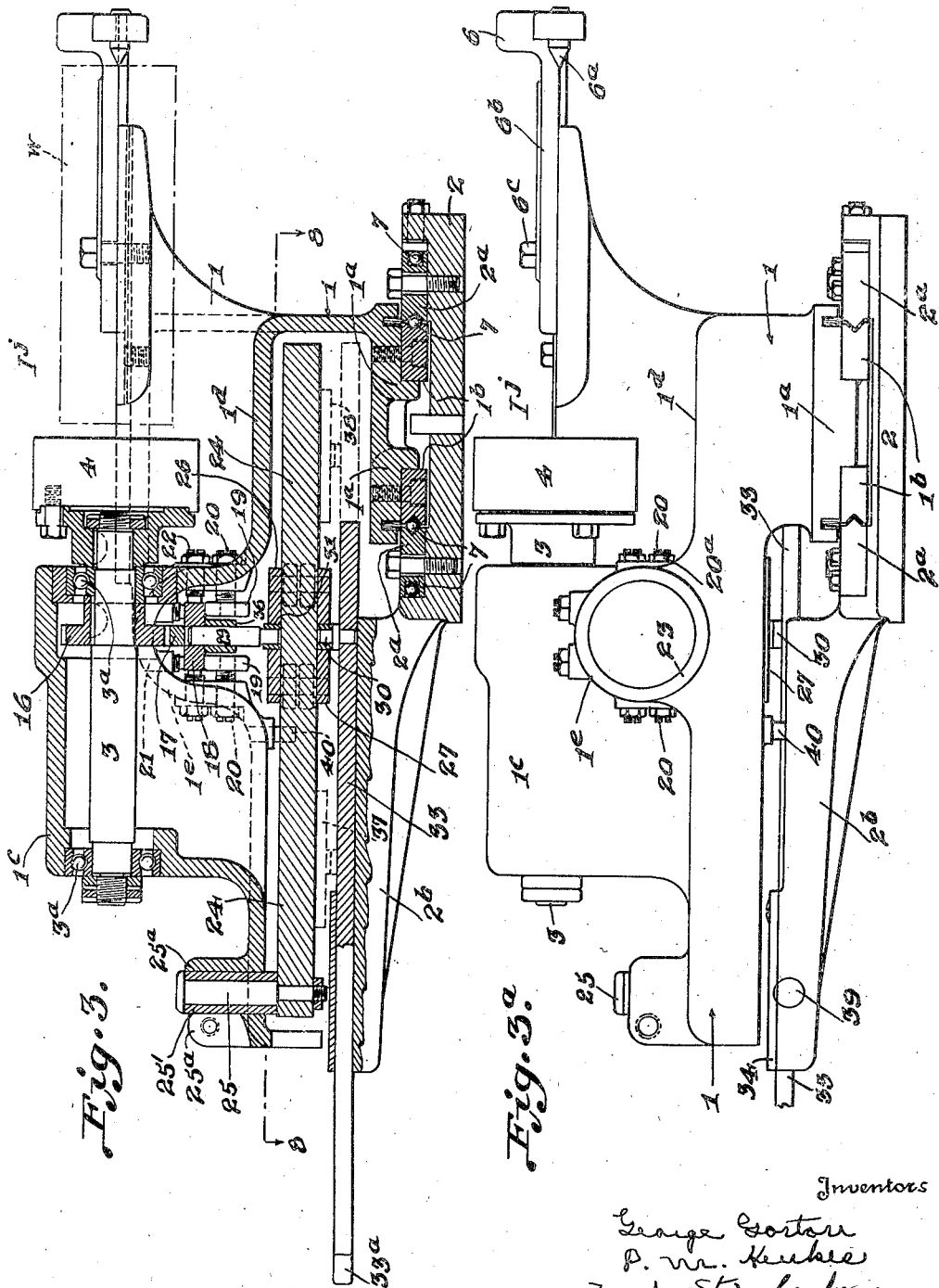
Fig. 3 is a cross section on the line 3—3, Fig. 2.

This housing base 1a, and the bed 2, are complementary to each other to provide a longitudinal slideway whereby the carriage is supported from the bed to straight line free and sensitive longitudinal movements, with the carriage positively held against substantial vertical movement with respect to the bed. Although we do not wish to so limit all features of our invention, the carriage can be supported by balls or rolling elements, such as 7, interposed between complementary portions of the base 1a, and the bed 2. As for example, we show the bed provided with normally fixed rails 2a, horizontally arranged longitudinally thereof with their inner longitudinal edges spaced apart, to receive between them horizontal longitudinal bars 1b, fixed to the under side of the base 1a. The adjacent longitudinal edges of each rail 2a, and its complementary bar 1b, are formed with longitudinal V-grooves as shown, in which the balls 7, are arranged as indicated by Fig. 3. If so desired, an endless series of traveling balls 7, can be provided for each rail 2a, and its complementary bar 1b; each rail 2a, being grooved around its ends and along its longitudinal outer edge to form an endless circuit or raceway for the balls.

Instead of mounting the work carriage on and confining the same to the supporting bed by endless series of traveling balls or rolling elements, to render the carriage highly sensitive and quickly responsive in action, the same result can be obtained by providing a row of balls in the complementary V-grooves between each rail 2a, and its complementary bar 1b, with the provision of suitable retaining or spacing means between the balls of each row, such as a cage or plate having perforations to receive the balls, all as will be readily understood by those skilled in ball bearing arrangements. Also, if so desired, ordinary dove-tailed and gibbed slideways can be provided between the bed 2, and the carriage 1, particularly where provision is made for proper lubrication, to permit the free straight line reciprocation of the carriage and to confine the carriage against substantial vertical movement with respect to the bed.

The work carriage can if so desired, project laterally in a horizontal plane above its base 1a, for instance, a substantial distance to the left (Fig. 2) of the vertical plane of the longitudinal axis of the carriage, and where such an arrangement is employed, we prefer to form or provide the bed 2, with a rigid horizontally projecting lateral bracket or arm 2b, extending say to the left, Fig. 2, centrally below the work carriage, when said carriage is in its normal position intermediate the length of its path of movement.

The particular form of work carriage disclosed as an example, provides the case or housing 1, with an elevated upwardly bulged tunnel-like formation 1c, the longitudinal axis of which is perpendicular to the straight line path of movement of the carriage, with this hollow tunnel formation 1c, arranged to one side, say to the left of the vertical plane of the longitudinal axis of the carriage. This tunnel 1c, forms the casing and provides the supporting bearings for the work holder spindle 3, which extends longitudinally through the casing and beyond the opposite vertical end walls thereof and is mounted therein on suitable bearings, such as end and radial thrust ball bearings 3a. Within the housing formed by the tunnel 1c, the gear 16 is fixed on the spindle 3 and hence is enclosed within the housing. The exposed end of the spindle 3, located above the depressed top 1d, of the housing 1, and to the right of said above mentioned vertical plane, is provided with any suitable work holding chuck 4, for instance, an adjustable chuck of the "wheel" type. This chuck 4 is normally rigidly fixed to the spindle 3 so that the longitudinal axis of the work w, is alined with the axis of the spindle when rigidly clamped and held by the chuck. Various well-known types of chucks can be employed capable of rigidly clamping pieces of work ranging from the minimum to the maximum diameter within the capacity of the machine. The chuck is of such formation as to grasp by its inner end a piece of work and rigidly hold the same with its entire circumference exposed in operative cutting relationship to the engraving tool on a complete rotation of such work.

The housing or case 1, is also preferably formed with an upward bulge or tunnel 1e, extending longitudinally of the carriage, approximately along the line of its longitudinal axis and intersecting or interrupted by the elevated transverse tunnel or bulge 1c, so that the hollow interior of the bulge 1c, opens into the hollow interior of the bulge 1e. This longitudinal upward bulge 1e, is usually open at its ends to receive tubular extensions 23, for housing the rack 17, and its supporting carrier 18, on their extreme movements. The rack 17, is preferably fixed to a stiffening and supporting carrier bar 18, arranged longitudinally thereof so that the rack 17, and bar 18, move as a unit and are arranged longitudinally of and within the upward bulge or tunnel 1e, and travel on and are supported by opposite series of spaced idler rollers 19, mounted on horizontal trunnions or pivot pins 20, extending inwardly through the opposite side walls of the tunnel 1e. These horizontal studs or pins 20, are preferably screw-threaded and provided with exterior adjusting nuts 20a, exposed at the exterior of said tunnel, and preferably eccentrically arranged and adjustable for elevating and depressing the rack 17, for close adjustment of the mesh between rack 17, and gear 16.

Also, if so desired, screw-threaded studs 22, with complementary exterior clamping nuts, can be provided extending horizontally through the opposite side walls of the tunnel 1e, into sliding engagement with the opposite side edges of the rack bar 18, for eliminating any objectionable lateral play of said bar 18.

Also, if so desired, threaded studs 21, having exterior accessible clamping nuts, can extend vertically through the top of the tunnel 1e for sliding engagement with the top surface of the rack bar 18, for eliminating any undue vertical looseness of said bar.

The rack 17, and its wider stiffening and supporting bar 18, rigid therewith, are considered as a unit, and are supported for sensitive free and easy reciprocation, by the more or less widely spaced pairs of vertically rotating rolls 19, which maintain the horizontal rack 17, in mesh with geared pinion 16, and against vertical tilting from the horizontal position.

Relative pinion-rotating movements between said rack and the pinion, are caused by straight line movement of the work carriage 1, on its bed, by reason of an operative connection between said rack, the carriage, and a relative fixed part, such as a part rigid with bed 2, and as hereinbefore generally stated, this connection is manually adjustable and settable for every change in work diameter, to compensate for the difference in pitch diameter between the pinion 16, and the exterior diameter of the work piece to be engraved.

In the embodiment disclosed as an example from among others, this operative connection embodies a straight longitudinally-elongated horizontal lever 24, arranged below and extending transversely with respect to fore and aft or longitudinal axis of the work carriage 1. This stiff strong lever is arranged above the bed 2, and the stiff arm 2b, rigid with said bed, and said lever, preferably, has parallel opposite longitudinal vertical side faces and parallel horizontal top and bottom edges. The lever 24, is pivotally coupled to the work carriage 1, by a vertical pivot pin 25, through which power is applied to the lever for relative horizontal swing thereof by straight line movement of the carriage in either direction. This pivot pin 25, is in this example, applied to the left hand end of the lever, which constitutes the extremity of the lever power arm. The extreme left hand end of the strong stiff carriage housing 1, preferably forms a vertical split clamp or hub 25a, provided with the usual clamping bolt by which the hub normally rigidly grips and holds bushing 25'. The vertical pivot pin 25, is shown formed by a strong cylindrical stud journaled in said bushing to rotate therein on its longitudinal axis. This pivot pin, while freely rotatable in said bushing, is held therein against objectionable longitudinal movement, and its reduced longitudinal lower end depending below the bushing is preferably fixedly clamped to the outer end or extremity of lever 24, as by extending therethrough with a clamping nut on the projecting threaded end of the stud or pin, or by any other suitable arrangement. The lever 24, is preferably hung from and upheld by said pivot 25, and thus, in this example, is supported at its power end from the carriage.

The lever has rack holding, impelling or work performing connection with the rack 17, at a point midway the length of the rack, and approximately more or less midway the length of lever 24, through the medium of a vertical pivot stud 29, located, preferably, in the vertical plane of the longitudinal axis of the work holder spindle 3, (when the carriage is in midway position) and the center longitudinal axis of rack 17. This pivot stud is preferably fixed in a vertical socket of the block 36, fixed to and depending from bar 18, of rack 17. This block 36, is relatively narrow to pass freely between the opposing rollers 19, of each roller set. The depending lower end of this pivot stud 29, preferably rotatably fits down in and is centered by vertical socket 31, in the top horizontal frame plate of a slide or carriage 26, located on the lever 24, against relative lateral movements, but permitting limited longitudinal movement of the lever as it swings on its axis 25. This slide maintains the vertical pivot 29, constantly in the vertical plane of the center longitudinal axis of lever 24, and block 36, maintains said stud in its fixed vertical position with respect to the slide.

The lever is provided with a vertical fulcrum 30, normally in a fixed position with respect to a part of the machine that is stationary with respect to the lever and the work carriage. For instance, this normally fixed lever fulcrum can be carried by the bed 2, or a part normally fixed thereto. This upstanding fulcrum stud or pin 30, is preferably located in the vertical plane of the central longitudinal axis of lever 24, and extends upwardly into and rotatably fits vertical socket 32, in the bottom plate of a slide or carriage 27, on the lever 24. Said bottom plate of slide 27, extends across and fits the bottom longitudinal face of lever 24, while the top plate of slide 26, extends across and fits the top longitudinal face of lever 24. For lever fulcrum adjusting purposes, the slide 27, is slidable longitudinally of the lever under the propulsion of fulcrum stud 30, and its carrier, and slide 27, fits lever 24, against relative lateral movement.

The top slide 26, centrally receiving pivot 29, is provided with horizontal rotary rolls bearing against opposite vertical longitudinal vertical side faces of lever 24, preferably two rollers 26a, against one side face and a single central roller 26a against the opposite side face, each roller mounted on a vertical stud depending from the top frame plate 26, the single roller 26a, being preferably mounted on an adjustable eccentric pin 26b, for close adjustment of the rolling contact of all three rollers with the lever side walls to take up lateral looseness.

The bottom slide 27, centrally receiving the vertical fulcrum 30, of the lever is preferably similarly provided with horizontal rollers 27a, two bearing against one side of lever 24, with a centrally arranged single roller bearing against the opposite side of the lever and having an adjustable eccentric pivot pin 27b, for taking up slack.

Suitable means are provided whereby the lever fulcrum 30, can be adjusted to any desired point longitudinally of lever 24, and there set or fixed with respect to the lever and work carriage. As an example of means from among others, that can be employed for this lever fulcrum shifting and setting purpose, we disclose a longitudinally elongated horizontal straight lever-fulcrum-setting and adjusting bar 33, located below lever 24, and the work carriage, and arranged transversely with respect to the carriage and rack 17, and generally longitudinally of lever 24. This bar 33, is set down in and, longitudinally slidable of, a depressed channel 2g, formed longitudinally of the top of fixed bed arm 2b. At the exposed front end of fixed arm 2b, an accessible clamping screw 39, or other suitable means can be provided for locking bar 33, in the longitudinal position to which adjusted, and whereby said bar can be released for sliding longitudinally inwardly or outwardly. The bar 33, can be held down slidably in the channel or slideway by top plate 34, secured on the front end of arm 2b, if so required.

The bar 33, forms an exposed accessible handle and scale bearing end 33a projecting longitudinally outwardly beyond the end of fixed bracket arm 2b. The indicating indicia of the scale shown are arranged longitudinally of said bar end and are visible to the left beyond the carriage, and a cooperating visible index 33b, is provided at the free extremity of fixed arm 2b, if so desired by the outer end of top plate 34.

When the carriage 1, is located on its supporting bed 2, in a position midway the length of its straight line path of movements on bed 2, (Figs. 2, 3, and 4), the pinion 16, is arranged over the center of the length of rack 17, and the lever 24, is located directly above and parallel with the fulcrum-carrying bar 33. In this position, the longitudinal axis of lever 24, is parallel with the axis of work holder spindle 3, and is perpendicular to the longitudinal axes of the rack 17, and the straight line path of travel of carriage 1. When the carriage 1, starts to travel in either direction from said central or normal position, the pivot stud 25, advances in a straight line with the carriage and hence carries the power end of lever 24, forward in said straight line with the carriage, but as the lever at some point intermediate its length, is pivotally anchored to the fixed bed 2, through bar 33, by the lever fulcrum 30, said lever will be swung or rocked laterally on said relatively fixed vertical fulcrum by the straight line lateral advance of its power end, thereby through the connection with rack 17, by lever work-applying pivot pin 29, operative relative motion results between rack 17, and pinion 16, to cause rotation of pinion 16, and the work w. During carriage travel, the rotation of the work holder 3, 16, 4, results from travel of geared pinion 16 longitudinally of the rack 17, and from longitudinal movement of the rack 17 relative to the carriage, by the propelling action of the swinging lever 24, through the push and pull connection of pivot pin 29, from lever to rack, all dependent on the position of the lever fulcrum 30, along the lever 24, and the distance thereof along the lever from the power applying pivot pin 25, with respect to the distance along the lever from pivot 25, to the pivotal connection 29, between the lever 24, and rack 17.

Thus, when the external diameter of work w, is the same as the pitch diameter of pinion 16, as disclosed by Figs. 3, 4, and 9, the bar 33, is moved longitudinally inwardly or outwardly, to bring the fulcrum 30, of lever 24, into alinement with the pivot pin 29, that couples lever 24, to rack 17, and said bar is then set or fixed by clamp 39. Hence, when the carriage 1, travels on its straight line movements, the lever 24, swings laterally on a fixed fulcrum alined with pin 29, and there is no relative or differential movements of the rack in the advancing carriage, as the pin 29, then holds the rack against longitudinal movement while the advancing carriage rolls the pinion along the then stationary rack and thereby rotates the work.

The purpose is to actuate the work on a complete rotation by a full stroke or travel of the carriage, to permit engraving completely around the circumference of the rounded or cylindrical work. The full stroke or travel of the carriage that produces a complete revolution of the cylindrical work, of any diameter within the capacity of the machine, is determined by the maximum relative swing of the lever 24, with respect to the carriage, through the arc B, Figs. 2, 9, and 11, and the means whereby such relative maximum swing of the lever is limited to such arc. The linear length of such full stroke or travel of the carriage varies with the position of the lever fulcrum 30, along lever 24, to agree with the linear length of the circumference of the particular cylindrical work diameter for which the lever fulcrum is located and set, but within the capacity of the machine, the full relative swing of lever 24, through arc B, is the same in length to accomplish a complete revolution of the work, whatever may be the diameter of the work, and wherever the lever fulcrum may be located within its adjustment range along lever 24.

The linear length of the straight line travel of the carriage is the same as the parallel straight line lateral travel of the cutter head and cutter, and the mechanism causing and controlling the rotation of the work by said travel of the carriage, is designed to cause a complete revolution of the work on each full straight line travel of the carriage whereby the work can be engraved completely around its circumference. Such full straight line travel of the carriage, varies in linear length however, for each work diameter for which the organization is adjusted and set, within the capacity thereof, as said linear length of work carriage travel corresponds in each instance to the flattened out or linear length of the circumferential surface of the particular piece of work.

The purpose of the organization that converts the straight line linear travel of the work carriage into rotary motion of the cylindrical work, is to determine the linear length of the full straight line stroke of the work carriage, by the linear length of the distance around the circumference of the particular work diameter for which the machine is adjusted and set, so that the cylindrical work can be engraved completely around the circumference thereof, on a full straight travel of the carriage.

In the particular example illustrated, without intending to so limit our invention, the diagrammatically-illustrated adjustable chuck 4, is designed to rigidly and yet releasably hold cylindrical work pieces of diameters varying, say, from cylinders three quarters of an inch in diameter to, say, cylinders three inches in exterior diameter. The gear 16, fixed on the work holder spindle 3, is, say, two inches in pitch diameter.

For a machine of the just mentioned capacity, the scale shown longitudinally arranged on the end 33a, of lever-fulcrum-carrying bar 33, is say approximately eight inches long, and divided into a suitable number of spaces by a longitudinal series of equally spaced visible indicating marks each adapted to register with the cooperating fixed index 33b, according to the longitudinal position of bar 33.

Merely as an example, where the diameter of gear 16, is two inches, and the machine capacity is as above noted, we have indicated by "3", "2", etc. and ".75", along the scale on the exposed end 33a, of bar 33, positions to which said bar should be adjusted for work of the following diameters, namely;—3 inches; 2 inches; and three-quarters of an inch, respectively.

Figure 2:
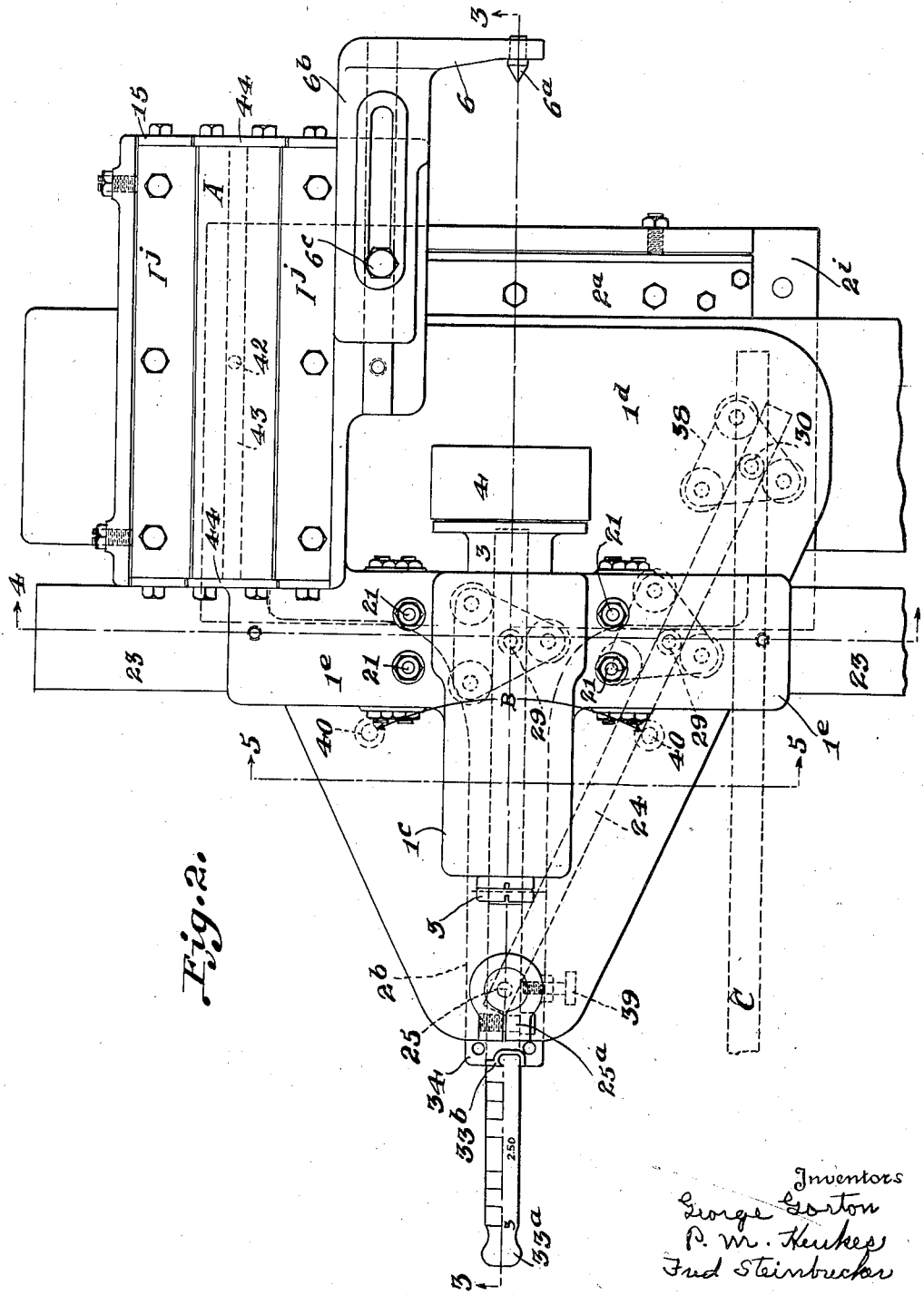

Figs. 2, 3 and 9, of the drawings show the positions of the bar 33, and the lever fulcrum 30, when the bar is longitudinally moved and set with the indication "2", registering with index 33b, and the machine is thus set, in the example shown, to engrave completely around the circumference of work of the same diameter as gear 16; namely, in the above noted example, two inch diameter roll or cylindrical work w.

Now in this indicated example, to set the machine to engrave completely around the circumference of work of a diameter less than two inches, for instance, work three-quarters of an inch in diameter, the bar 33, is released, and pulled outwardly until the indication ".75" registers with the index, thereby moving the lever fulcrum 30, outwardly along the lever 24, a distance from its former ("2" position) equal in this particular example to approximately two and five-eighths of an inch from the lever pivot 25, when the lever and carriage are in normal central positions, to compensate, in this example, for the difference in diameter between the work and gear 16.

The position of the fulcrum 29, along the lever, in this adjustment for .75 diameter work, is shown by dotted lines 37, Figs. 3 and 10. With this .75 diameter adjustment, the linear distance traveled by the cylindrical surface of the rotating work, on a complete revolution thereof, is approximately 2.3562 inches, and the linear length of the straight line travel of the carriage 1, for a complete revolution of the work is the same distance; namely, 2.3562 inches, to carry the relative swing of lever 24, through the full length stroke of said arc B. The carriage 1, on its travel of 2.3562 inches, under this just mentioned lever fulcrum adjustment, attains a full length stroke of lever 24 through arc B, because of the speed increasing action of the leverage propelling the rack 17, by reason of the short distance along lever 24, from fulcrum 30, to power applying pin 25.

In this indicated example, to set the machine to engrave completely around the circumference of cylindrical work three inches in diameter, the bar 33, is released, and pushed inwardly until the indication "3", registers with index 33b. By this adjustment, the slide 27, is by lever fulcrum 30, caused to slide longitudinally of lever 24, to the position indicated by dotted lines 38, Figs. 2, 3, 8, and 11. The fulcrum 30, of the lever is thus located near the inner or free end thereof and approximately ten and one-half inches longitudinally of lever 24, from the lever pivot 25, when the lever and carriage are in normal central positions. On the operative movements of the carriage and parts with the lever fulcrum 30, in this set position for a three inch diameter piece of work, the difference between the diameters of the gear 16, and the work w, is compensated, to produce a complete revolution of the work by a complete revolution of said gear with the lever 24, swinging through the arc B, and the carriage traveling a full straight path through a linear distance of 9.4248 approximately, which is the theoretical linear length of the circumferential surface around the work.

The linear speed of rack travel with respect to the linear speed of travel of the carriage varies with each adjustment of lever fulcrum 30, for a work piece of different diameter, to attain at the engraving tool point linear speed of the traveling surface of the rotating cylindrical work equal to the linear speed of the straight line travel of said engraving tool and the carriage, while engraving completely around the circumference of the work, whatever the diameter thereof within the capacity of the machine.

In the foregoing example, proposing a gear 16, two inches in pitch diameter with the organization adjustable to adapt the same to engrave completely around the circumferences of cylindrical work pieces of any diameter ranging merely as an example, from a piece of three inches in diameter, down to a piece three-quarters of an inch in diameter, without replacement of parts in the rack and pinion gearing, the line longitudinally of lever 24, when in the central intermediate position, from pivot 25, to push and pull pivot pin 29, is for example seven inches, and fulcrum 30, when set for the maximum three inch diameter cylindrical work, is located ten and one-half inches from lever pivot 25, when said lever is in its said central intermediate position, and this distance decreases in direct portion to the decrease in cylindrical work diameter, as the lever fulcrum is adjusted and set toward the lever pivot 25, for operation on cylindrical work pieces having diameters less than the three inch diameter maximum, down to the lever fulcrum setting for the three-quarter inch diameter work, where the length of said center line is two and five-eighths inches, which is the ratio to ten and one-half inches as three-quarters inch is to three inches.

In the example illustrated, a complete revolution of the gear 16, consequently a complete revolution of the work w, results from relative swing of lever 24, throughout the length of arc B, under the actuation of the carriage traveling along a path the length of which is determined by the particular setting of the fulcrum of said lever. Any suitable means can be provided to limit the relative swing of lever 24, with respect to carriage 1, to travel the length of arc B, i. e., to impel the gear 16, on a complete revolution. For instance, we show for this purpose, widely spaced stop pins or abutments 40, 40, normally fixed to and rigid with the carriage housing 1, and depending therefrom into the path of lever 24, to define the opposite end limits of the arcuate path of relative swing of lever 24, to said arc B. The straight line travel of the work carriage in either direction, is stopped when the lever 24, in its relative lateral swing, strikes the adjacent stop 40, as it will when the lever on its relative swing reaches one end of said arc B. The carriage when on its straight line travel in the opposite direction, will be again stopped, when the lever on its relative swing, strikes the other stop 40, as it will when said lever reaches the other end of said arc B.

The longitudinal travel of the transverse slide A, on the elevated horizontal inner end deck of the carriage 1, can be limited to prevent the slide running clear of its slideway in either direction. For instance, we show an instanding stop lug or stud 42, fixed to the deck of the carriage and freely entering a longitudinal groove 43, in the bottom of slide A, which slide has normally fixed opposite end plates 44, covering the ends of said groove, and adapted to engage said stud 42, when the slide reaches its limit of reciprocation in either direction.

We preferably provide means for steadying centering and supporting the outer ends of long roll-like or cylindrical work pieces w, the inner ends of which are concentrically clamped and rigidly held by the adjustable chuck 4. For instance, we show a bracket having rigid forwardly extending arm 6, having rigid laterally centering cone 6a, for alinement with the longitudinal axis of the work w, and fitting a complementary central socket at the outer end thereof. This arm 6, is rigid with a horizontal elongated slotted base 6b, transversely arranged on the elevated inner end deck 1j, of the carriage 1, for longitudinal sliding adjustment to move arm 6, and its cone to accommodate work pieces of different lengths. The bracket is normally rigidly clamped to deck 1j, by a suitable clamping nut or threaded headed bolt 6c.

The transverse slide A, like the carriage 1, carrying said slide, is preferably so movably mounted as to be sensitive and quickly responsive to impelling movements received through the pantograph and generated by the hand of the operator on the pantograph and/or the stylus in tracing the copy. The hand of the operator thus controls the engraving operation, and hence the desirability of providing carriage and slide mountings that render the same instantly sensitive and responsive to slight movements and pressures of the hand and that transmit to the hand the sensitive "feel" of the cutting operation and the progress thereof. We hence, prefer to provide a sensitive ball or other rolling bearing mounting for the slide A, as well as for the carriage 1, although we do not wish to so limit all features of our invention or for all purposes. Particularly, for some purposes the slide A can be mounted in accurate dovetailed, gibbed, or other slideways, generally properly lubricated.

Also, to maintain quickly responsive sensitive carriage action, we prefer to form the carriage housing 1, of strong yet very light weight alloy, preferably as a casting of such alloy.

In the embodiment shown, we mount the slide A, on or in the deck 1j, of the carriage housing 1, by series of rolling elements or balls 7a, arranged parallel with the longitudinal axis of the slide. The balls can, if so desired, be arranged as endless traveling series of balls as disclosed in connection with the carriage, or can be formed by several straight rows of balls, with the balls of each row maintained separated and free to revolve by a suitable cage or perforated plate. We show the opposite parallel longitudinal edges of slide A, formed with right angle V grooves, and the deck 1j, having parallel rails 1k, normally fixed to the deck, having their inner longitudinal edges formed with right-angle V grooves complementary to the grooves in the slide, respectively, so that the balls of each row are confined in a raceway formed by a groove of the slide and the complementary groove of a rail. The balls 7a, thus lock the slide A, to the deck 1j, against objectionable relative vertical movement of the slide, and also maintain the slide against substantial relative lateral movement, as do the balls 7, with respect to bed 2, and carriage 1.

The cutter head 8, universally movable laterally by and under the control of the pantograph, is operatively connected with the carriage 1, through the medium of slide A, to propel the carriage of its straight line travel with the slide, and to propel the slide on its independent longitudinal straight line movements, on the carriage during which, in this specific example, the work piece remains at rest and the cutting tool travels longitudinally of the work piece in the vertical plane of the longitudinal axes of the work piece and the cutting tool.

As an example of mechanism from among others, that can be employed to establish this operative connection, we show a rigid vertical post 12, upstanding from slide A, midway the width and length thereof and fixed thereto. This post forms a vertical longitudinal slot-like holder, in which the laterally projecting shank 11a, of an approximately right-angle bracket 11, fits and is vertically adjustable. The shank is normally rigidly fixed to said post, in the desired vertical adjustment by suitable means, such as clamping threaded bolt or screw 12a.

The horizontal arm of this normally-fixed stiff or rigid bracket 11, is elevated and extends outwardly or forwardly over the carriage 1, to the cutter head 8, located over the work, and the outer end of this stiff bracket arm is operatively coupled to said head against relative lateral movements, but so as to permit relative rotative movements on a longitudinal axis that is alined or coincident with the longitudinal axis of the vertical engraving tool carried by said head. As an example, this operative connection between the bracket arm 11, and the cutter head 8, includes an annular end and radial thrust ball bearing having a circle of balls 10, and concentric outer and inner raceway rings 9, 9a, surrounding and concentric with the common vertical longitudinal axis of the cutting tool and depending end of the housing of the cutter head 8. The outer raceway ring 9, of said ball bearing, is fixed to a horizontal plate 10a, fixedly secured to the under side of the linkage member from which the lower end of the cutter head depends. The outer end of this plate provides a circular opening through which the cutter head depends and in which said ring 9, is fixed. The inner raceway ring 9a, is fixed on and surrounds an upstanding cylindrical wall 11', rigid with bracket arm 11, and surrounding a vertical opening through the front or forward end thereof.

The tension rod 11j, for the belt drive to the cutter, can be, if employed, and if so desired, coupled to the cutter head 8, through the medium of a ring-like plate 11k, loosely surrounding the cylindrical upstanding wall 11', of bracket arm 11. The rod 11j, can be adjustably secured to plate 11k, by a nut and screw threaded coupling.

The circle of balls 10, and the ring raceways 9, 9a, are concentric with the longitudinal axes of the cutter head and engraving tool, and the slide A, is hence operatively coupled to the cutter head against relative lateral movements, on a vertical axis alined with the axis of the engraving tool, permitting relative rotative movements of the cutter head on its longitudinal axis, during the universal lateral movements of said head. This accurate sensitive relationship between the cutter head and slide A, as established by said operative connection, accurately maintains the axes of the engraving cutter and the work perpendicular to each other and in a common vertical plane, through all universal lateral movements of the cutter and resulting straight line movements of the carriage and slide A.

The vertical adjustability of the bracket member 11, can be utilized where the diameter of the work w, requires elevation or lowering of the cutter head.

If so desired, the plates 44, secured on the ends of slide A, cooperate with the complementary plates 15, secured to the ends of deck 1j, to cover the ends of the raceways in which rows of balls 7a, are located.

Also, where endless traveling series of balls 7, are provided to support and confine the carriage 1, to its straight line path in a normally fixed horizontal plane, suitable means can be provided to form and cover the opposite end return bends of the endless raceways for the traveling balls. If so desired, plates 2i, can be secured to bed 2, for this purpose.

In the particular example shown without intending to so limit the generic invention, the rotary work holder is pantograph impelled on its rotary movements at the same reproduction ratio as is the impelling laterally movable part of the pantograph or part thus laterally moved by the pantograph, according to the reproduction ratio for which the pantograph is set. For instance, the cutter head 8, is moved laterally by the pantograph, and these linear movements of said head are according to a certain reproduction ratio, and a reproduction-ratio-maintaining operative connecting transmission extends from said member (for instance said cutter head) to the rotary work holder, and is actuated by said reproduction ratio linear movements of said member to actuate the holder and its work piece through a complete revolution to carry the circumferential surface of the work piece past the cutting tool through the same linear distance at the same speed, as the impelling movements of said member. This transmission in this instance, includes the cutter head coupling to slide A, the work carriage, the differential lever connection 24, and the mechanism for changing the lever movements into work holder rotation. In this example, the linear movements of the work carriage are of the same length and speed as the corresponding impelling movements of the cutter head. A rack and pinion type is illustrated as an example of means to convert pantograph-impelled linear movements into rotary movements, and the rotary member, such as gear or pinion 16, is of fixed pitch diameter, and so remains whatever the diameter of the work piece held by holder or chuck 4, for which the organization has been adjusted and set. The longitudinal member, such as rack 17, is carried and transported by the work-holder-transporting carriage 1, and this longitudinal member is mounted in said carriage for relative longitudinal movements during carriage movements and rotary member rotation, and said longitudinal member 17, is also adapted to be held against longitudinal movements during carriage travel and rotary member rotation, notably, in this example, when the exterior diameter of the work piece is the same as the pitch diameter of the rotary member 16, and the reproduction-ratio compensating differential mechanism has been adjusted and set accordingly (Fig. 3).

In this particular embodiment, the difference in diameters between rotary member 16, and the work piece held by the holder, is compensated, by control of the relative movements of the longitudinal member, such as rack 17, in the work carriage, during carriage travel and pinion 16, rotation. This control is established through the medium of lever 24, actuated by the work carriage travel through power connection 25, and controlling said longitudinal member 17, through work applying connection 29, and rockable laterally on normally fixedly located fulcrum point 30. Thus, the ratio compensation is established or controlled by relative operative re-arrangements and setting of the just mentioned three effective points; namely, 25, 29, 30, with respect to the lever, to vary the speed, length and/or direction of lateral movements of work point 29, and consequently the relative longitudinal movements of rack 17, during carriage travel and pinion rotation. These operative re-arrangements of said three effective points, can be attained by shifting the fulcrum point 30, longitudinally of the lever toward or from the power point 25, and away from the position of Fig. 3, wherein points 30, and 29, are in alinement and no relative movement of rack 17, takes place. In the example shown, without desiring to so limit the invention, the fulcrum point 30, can be shifted to various points along the lever, outwardly beyond the position of Fig. 3, as well as to various points along the lever, inwardly toward the power point 25, from the position of Fig. 3, to thereby increase or decrease the length of the power arm of the lever and the position of the work point 29, with respect to said fulcrum point. For instance, the fulcrum point 29, is shifted outwardly of the lever beyond the position of Fig. 3, when the work piece diameter exceeds the pinion 16, diameter, see Fig. 11, for instance, with the result that on carriage travel, the rack 17, is propelled by the lever longitudinally in the traveling carriage in the direction of carriage travel and also in the direction of but slower than the travel of the rotating pinion longitudinally of the rack. The linear distance thus traveled by the rack is less than the linear distance simultaneously traveled in the same direction by the carriage, to bring about a complete revolution of the work, with the cooperative relative movements of both the rack and rotating pinion so regulated, that the linear length of such complete travel of the carriage will equal the linear length of the travel of the circumference of the particular work piece through a full revolution with uniform linear speed of travel.

Where the organization is adjusted and set for a work piece diameter less than the pitch diameter of the rotary member 16, the fulcrum point 30, is moved toward the power point 25, for instance, as in Fig. 10. In this rearrangement of the operative points 25, 29, 30, the power arm of the lever 24, is materially shortened over the adjusted positions for work pieces of larger diameters, and the fulcrum point 30, is arranged between power point 25, and work point 29, with the result that on work carriage travel, the rack 17, is propelled by the lever 24, longitudinally in the traveling carriage in the opposite direction to that in which the carriage is traveling and in which the rotating pinion is advancing longitudinally of said moving rack, but at a different rate of speed. In this Fig. 10 arrangement, the full linear length of relative travel of the rack with respect to the full linear length of travel of the carriage, for a complete revolution of the work, is increased over the corresponding linear travel lengths in the arrangement of Fig. 11. In this Fig. 10 adjustment for small diameter work pieces, the rack travels longitudinally with respect to the moving work carriage, in the opposite direction to that of the travel of the rotating gear along the rack, and by such cooperative relative movements of the rack and pinion, under the control of the differential lever 24, the circumferential surface of the small diameter work piece through a full revolution, travels at the same speed and for the same linear length, as the work carriage in impelling such rotation.

In all of the various operative rearrangements, of the leverage points 25, 29, 30, to which the mechanism can be adjusted and set for any work diameter within the machine capacity, during a complete revolution of the work piece whatever its diameter, the rotary member such as pinion 16, travels throughout the full operative length of the longitudinal member such as rack 17, and the reproduction ratio compensating result is attained by control of the differential relative movements of the longitudinal rack in the work carriage and with respect to the pinion travel, during the linear movements of the work carriage.

The instant disclosure of an embodiment of our invention, is merely as an example from among others within the invention scope, for purposes of explanation and illustration, and not for purposes of limitation and restriction beyond prior art requirements.

The foregoing specifications set up various work sizes and machine capacities, not for purposes of limitation, but merely for purposes of explanation and example, as our invention can be embodied

What we claim is:—

1. In an engraving machine; a rotary work holder adapted to rigidly hold a roll-like work piece, and rotate the same on the longitudinal axis of the piece with its circumferential surface in operative relation to an engraving cutter, said holder being of a capacity to selectively receive and hold such work pieces of different diameters; means in which said holder is rotatively mounted and by which said holder is transported; and mechanism for rotating said holder by converting rectilinear movements into rotary movement of said holder and its work piece, said mechanism including a concentric driven rotary member of fixed effective diameter for rotating said holder, and also including a ratio compensating operative connection manually adjustable to compensate for the difference in effective diameters between said member and the particular work piece to be engraved.

2. In an engraving machine; a support; a work carriage movable in either direction in a straight line with respect to said support; a work holder transported by and rotatable with respect to said carriage; said holder being adapted to selectively hold work pieces of different diameters, and to support and rotate the selected work piece on the longitudinal axis of said piece; and means including a concentric holder rotating gear of fixed pitch diameter fixed to said holder for converting the straight line movements of said carriage into rotary movements of said holder and the work piece held thereby, embodying ratio compensating mechanism manually adjustable according to the diameter of the work piece to compensate said means for the difference in effective diameters between said gear and the work piece for varying and limiting the linear travel of said carriage to a distance at least equal to the linear distance completely around the circumference of the particular piece of work to be operated on.

3. In an engraving machine adapted to engrave completely around the circumference of roll-like work pieces of different diameters within the capacity of the machine; a support; a work carriage having a rectilinear path of movements with respect to said support; a work holder adapted to grasp, support and rotate on its longitudinal axis roll-like work pieces of different diameters, said holder and its work piece being carried and transported by said carriage and relatively rotatable with respect thereto; means actuated by said rectilinear movements of said carriage for rotating said holder and its work piece while being transported by the carriage, said means including a holder rotating gear of a fixed pitch diameter, and mechanism for actuating said gear, said mechanism including ratio compensating means manually selectively adjustable according to the diameter of the work to be operated on, for compensating the difference between the work diameter and said pitch diameter.

4. In an engraving machine; a rotary work holder adapted to rigidly hold a roll-like work piece, and rotate the same on the longitudinal axis of the piece with its circumferential surface in operative relation to an engraving cutter, said holder being of a capacity to selectively receive and hold such work pieces of different diameters; means in which said holder is rotatively mounted and by which said holder is transported along a path by rectilinear movements; and mechanism for rotating said holder by converting the rectilinear movements of said means into rotary movement of said holder and its work piece, said mechanism including an operative ratio compensating connection capable of selective adjustment to maintain the linear speed of the circumferential surface of the rotating work piece past the engraving cutter, whatever the work piece diameter, the same as the linear speed of said movements of said means.

5. In an engraving machine; a support; a work carriage movable relatively to said support in a straight line; a work holder transported by and rotatably mounted in said carriage, said holder being adapted to detachably receive and rigidly hold a roll-like work piece and rotate the same on the longitudinal axis of the work piece, said holder being adjustable to selectively receive and hold roll-like work pieces of different diameters; and mechanism for rotating said holder in said carriage, said mechanism being actuated by said straight line movements of said carriage, said mechanism including a concentric holder-rotating circular member of a fixed pitch diameter, and operating connections for rotating said member to attain a full revolution of the work piece by a straight line travel of said carriage equal in length to the linear length of the circumference of the particular work piece, said connection provided with manually settable ratio compensating means for adjusting said connection to compensate for the difference between the diameter of the work piece and the pitch diameter of said circular member.

6. In an engraving machine for engraving completely around the circumference of a roll-like work piece; a support; a rotary work holder adapted to replaceably hold a roll-like work piece and rotate said piece on its longitudinal axis with the circumferential surface of said piece in operative relation to an engraving tool, said holder being adjustable to selectively receive and rigidly hold different roll-like work pieces of varying diameters; a laterally movable stylus-controlled pantograph; a cutter head provided with an engraving tool, means being provided for operatively maintaining the work-piece held by the holder and said tool with their axes perpendicular to each other and in a common vertical plane; means whereby lateral movements imparted by the pantograph that are longitudinally of the work piece actuate relative movements between said work piece and said tool that are longitudinally of said piece; and mechanism whereby lateral movements imparted by said pantograph that are transverse with respect to said axis of the work piece, actuate said holder and the work piece held thereby on their rotary movements, said mechanism including an operative connection having manually-settable ratio compensating adjusting means settable according to the diameter of the particular work piece to be operated on, to maintain the speed and distance of linear travel of the circumferential surface of the rotating work piece, the same as the speed and distance of linear travel of said holder rotation-impelling transverse movement of said pantograph.

7. In an engraving machine adapted for engraving completely around the circumference of roll-like work pieces of various diameters; a stylus-controlled pantograph; a cutter head providing a vertical spindle for the engraving tool; a work holder adapted to hold a roll-like work piece and rotate the same on the longitudinal axis thereof with the circumferential surface of said piece in operative relation to said engraving tool; and pantograph-actuated mechanism for rotating said work holder and its said work piece, including a relatively movable rack and a rotary gear, said gear being of a fixed pitch diameter and concentrically arranged with respect to said holder and its work piece, and a transmission for causing relative operative holder-rotating movements between the rack and gear, said transmission provided with ratio compensating differential means selectively adjustable according to the diameter of the particular piece to be operated on, to compensate for the difference between said pitch diameter and said work piece diameter.

8. In an engraving machine; a support; a rotatably mounted holder for holding a roll-like work piece and rotating the same on its longitudinal axis; and mechanism for effecting a complete rotation of said holder and the work piece held thereby, including a carriage for said holder movable relatively of said support; a laterally swingable lever operatively coupled to said carriage and actuated by said carriage movements, holder rotating transmission means from and actuated by said lever, a fulcrum for said lever normally fixedly located with respect to said support and carriage; and means for shifting the position of said fulcrum longitudinally with respect to said lever.

9. A support; a rotatable holder for a roll-like work piece adapted to rotate said piece on its longitudinal axis with the circumferential surface of said piece in operative association with an engraving tool arranged radially of said surface; and mechanism for actuating said holder and its work piece through a complete revolution, including a carriage for said holder, having a straight line path of movements with respect to said support, a laterally swingable lever, a normally fixed fulcrum for said lever, a lever-actuating connection between said carriage and the power arm of said lever; an elongated rack and gear relatively movable for rotating said holder; a work connection from said lever to said rack; and means for shifting the relative operative positions with respect to the lever, of the lever fulcrum, power connection, and work connection.

10. A support; a rotatable holder for a roll-like work piece adapted to rotate said piece on its longitudinal axis with the circumferential surface of said piece in operative association with an engraving tool arranged radially of said surface; and mechanism for actuating said holder and its work piece through a complete revolution, including a carriage for said holder, having a straight line path of movements with respect to said support, a laterally swingable lever arranged transversely with respect to said straight line path and longitudinally with respect to said work, a normally fixed vertical fulcrum for said lever, a vertical pivotal connection between said carriage and the power arm of said lever; an elongated rack and complementary meshing gear for rotating said holder; a vertical pivotal work connection between said lever and said rack; and means for shifting the position of the lever fulcrum point with respect to said pivotal power and work connections, said last mentioned means embodying a holder for said lever fulcrum having an exterior end, a visible adjustment indicating scale and index being provided, said holder being operatively associated with said support and adjustable with respect thereto and said lever.

11. A support; a rotatable holder for a roll-like work piece adapted to rotate said piece on its longitudinal axis with the circumferential surface of said piece in operative association with an engraving tool arranged radially of said surface; and mechanism for actuating said holder and its work piece through a complete revolution, including a carriage for said holder, having a straight line path of movements with respect to said support, a laterally swingable lever arranged transversely with respect to said straight line path and longitudinally with respect to said work, a normally fixed vertical fulcrum for said lever, a vertical pivotal connection between said carriage and the power arm of said lever; an elongated rack and complementary meshing gear for rotating said holder; a vertical pivotal work connection between said lever and said rack; and means for shifting the position of the lever fulcrum point with respect to said pivotal power and work connections, said lever fulcrum having a slide pivotally mounted on said fulcrum and provided with rolling contacts engaging the opposite longitudinal sides of the lever.

12. A support; a rotatable holder for a roll-like work piece adapted to rotate said piece on its longitudinal axis with the circumferential surface of said piece in operative association with an engraving tool arranged radially of said surface; and mechanism for actuating said holder and its work piece through a complete revolution, including a carriage for said holder, having a straight line path of movements with respect to said support, a laterally swingable lever arranged transversely with respect to said straight line path and longitudinally with respect to said work, a normally fixed vertical fulcrum for said lever, a vertical pivotal connection between said carriage and the power arm of said lever; an elongated rack and complementary meshing gear for rotating said holder; a vertical pivotal work connection between said lever and said rack; and means for shifting the position of the lever fulcrum point with respect to said pivotal power and work connections, said pivotal work connection including a slide through which the lever is relatively longitudinally movable, said slide having rolling contacts with the opposite sides of the lever, and an upstanding push and pull pin pivotally joining the slide and the rack.

13. In an engraving machine; a pantograph-propelled work carriage having a straight-line path of movements perpendicular to the longitudinal axis of the work; a rotary work holder rotatably mounted in said carriage and adapted to hold and rotate a roll-like work piece on the longitudinal axis of said piece with the circumferential surface of the piece in operative relation to an engraving tool radially arranged with respect to said surface; and mechanism actuated by said straight line movement of said carriage for rotating said holder and its work piece through a complete revolution for engraving completely around the circumference of said piece, said mechanism including a transmission member oscillatory through a definite arc of movement relatively to said carriage to effect a complete revolution of said work piece, said carriage providing stops cooperating with said member to define the limits of arcuate movements of said member and to define the limits of said straight movement of said carriage.

14. A bed; a work carriage; carriage-supporting ball mountings confining said carriage to the bed to straight line travel thereon, and interlocking with the bed and carriage to maintain the carriage against relative vertical and lateral movements, a horizontal transverse reciprocatory elongated slide; slide-supporting ball mountings confining said slide to said carriage to straight line travel thereon perpendicular to the carriage straight line movements, and interlocking with the carriage and slide to maintain the slide against relative vertical and lateral movements; a horizontally-movable manually-actuated pantograph provided with a stylus; a cutter head controlled in its lateral movements by said pantograph and provided with a spindle for the vertical engraving tool; a positive connection for transmitting the lateral movements of said head to said slide; a rotary work holder rotatively mounted in said carriage and adapted to hold a roll-like work piece and rotate the work piece on its longitudinal axis with the work piece circumferential surface in operative relation to the engraving cutter; and mechanism actuated by the straight line movements of the carriage for rotating the work holder and its work piece.

15. A bed, a work carriage confined thereto for relative straight line movements; a rotary work holder rotatively mounted in said carriage; mechanism actuated by the straight-line movements of the carriage for rotating said holder and the work piece held thereby; an elongated transverse slide mounted on said carriage for straight line travel thereon perpendicular to the carriage path of movement; an upstanding post fixed to said slide; a laterally projecting bracket vertically adjustable on said post and normally fixed thereto; in combination with a manually-actuated and controlled laterally movable pantograph; a cutter head controlled in its universal lateral movements by said pantograph and adapted to carry an engraving tool radially arranged with respect to the longitudinal axis of the work holder and in a common vertical plane therewith; and a rotary bearing connection between said bracket and said pantograph concentric with the longitudinal axis of said engraving tool.

16. In an engraving machine; a bed; a work carriage having a straight line path of movement along said bed; a laterally movable manually-controlled pantograph for actuating the carriage on its movements; a rotary work holder embodying a spindle rotatably mounted in said carriage provided with a work holding chuck; mechanism actuated by the straight line movements of the carriage for rotating the work holder and work, including a laterally swingable lever actuated by said carriage movements and having operative connection with said carriage, and having a normally-fixedly located fulcrum point; and a cutter head controlled in its lateral movements by said pantograph and adapted to carry an engraving tool maintained in operative relation to the work.

17. In combination, a frame; a pantograph-impelled member movable on reproduction-ratio scaled linear movements; a holder adapted to operatively receive and rotate a roll-like work piece with its circumferential surface in operative relation to a cutting tool, said holder capable of operatively receiving successively work pieces of different diameters; and a reproduction-ratio-maintaining operative connecting transmission from said member to said holder and actuated by said member movements for rotating said work piece through a complete revolution, at the same reproduction ratio linear speed and length as those of said member impelled movements to carry its circumferential surface past said tool through the same reproduction-ratio scaled linear distance as travelled by said member in impelling said work piece complete revolution, said transmission including means for converting said member lateral movements into rotary movements of said holder, said means provided with a ratio compensating differential mechanism manually adjustable for any work piece diameter from a maximum to a minimum for setting said means according to the diameter of the particular work piece to be engraved, for maintaining the rotary movements of such work piece at the same reproduction ratio as the impelling movements of said member.

18. In combination, a frame; a pantograph-impelled member movable on reproduction-ratio scaled linear movements; a holder adapted to operatively receive and rotate a roll-like work piece with its circumferential surface in operative relation to a cutting tool, said holder capable of operatively receiving successively work pieces of different diameter; and a reproduction-ratio-maintaining operative connecting transmission from said member to said holder and actuated by said member movements for rotating said work piece through a complete revolution, at the same reproduction ratio linear speed and length as those of said member impelled movements to carry its circumferential surface past said tool through the same reproduction-ratio scaled linear distance as travelled by said member in impelling said work piece complete revolution, said transmission including means for converting said member lateral movements into rotary movements of said holder, said means provided with a ratio compensating differential mechanism manually adjustable to set said means according to the diameter of the particular work piece to be engraved to maintain the rotary movements of the work piece at the same reproduction ratio as the impelling movements of said member, said mechanism provided with a visible adjustment-guiding scale of different work piece diameter indications from a minimum diameter to a maximum diameter.

19. In combination, a frame; a pantograph-impelled member movable on reproduction-ratio scaled linear movements; a holder adapted to operatively receive and rotate a roll-like work piece with its circumferential surface in operative relation to a cutting tool, said holder capable of operatively receiving successively work pieces of different diameters; and a reproduction-ratio-maintaining operative connecting transmission from said member to said holder and actuated by said member movements for rotating said work piece through a complete revolution, at the same reproduction ratio linear speed and length as those of said member impelled movements to carry its circumferential surface past said tool through the same reproduction-ratio scaled linear distance as travelled by said member in impelling said work piece complete revolution, said transmission including means for converting said member lateral movements into rotary movements of said holder, and a reproducing-ratio-controlling differential leverage connection having an actuating power point, a fulcrum point, and a work performing point, capable of several operative relative rearrangements to control the reproduction ratio rotary movements of work pieces of different diameters, respectively, and manually-controlled means for setting said leverage connection at any one of said rearrangements to accord with the particular diameter work piece to be engraved.

20. In combination, a frame; a pantograph-impelled member movable on reproduction ratio scaled linear movements; a rotary holder adapted to operatively receive and rotate a roll-like work piece on its longitudinal axis with its circumferential surface in operative relation to a cutting tool, said holder capable of receiving in succession work pieces of different diameters; a transporting carriage for said rotatable holder, having the same pantograph impelled reproduction ratio linear movements as those of said member; means for converting said reproduction ratio linear movements of said carriage into rotary movements of said holder for carrying the particular work piece held by the holder through a complete revolution, including a reproduction ratio compensating differential leverage connection from said carriage to said means and actuated by said carriage movements for maintaining the reproduction ratio linear movements of the circumferential surface of the rotating particular work piece in said holder the same as that of said linear movements of said carriage, said leverage connection being capable of adjustment and setting for each work piece of different diameter to be engraved.

21. In a machine for producing scaled reproduction of copy around the circumference of a roll-like work piece; a rotary holder for receiving and rotating a work piece through a complete revolution with its circumferential surface in operative relation to a cutting tool maintained with its longitudinal axis perpendicular to and in a common plane with the longitudinal axis of rotation of the work piece, said work holder capable of receiving and rotating any one of various work pieces of different diameters; a transporting carriage for said holder, said carriage being pantograph-impelled on reproduction ratio linear movements; means actuated by said carriage linear movements for converting the same into rotary movements of said holder; and a reproduction-ratio compensating differential leverage connection actuated by said carriage movements and controlling said means to maintain the reproduction-ratio linear travel of the circumferential surface of the particular work piece in said rotating holder the same as that of said linear movements of the carriage whatever the diameter of said work piece within limits, said leverage connection being adjustable to shift the relative operative position of its fulcrum point to set the same according to the diameter of the particular work piece to be engraved.

22. A machine for producing scaled reproduction of copy around the circumference of a roll-like work piece, embodying a rotary holder for receiving and rotating a work piece through a complete revolution with its circumferential surface in operative relation to a cutting tool, said work holder capable of holding and rotating any one of various work pieces of different diameters; a transporting carriage for said rotatable holder, impelled on reproduction ratio linear movements; means transported by said carriage for converting said reproduction ratio linear movements of said carriage into rotary movements of said holder; and a reproduction ratio compensating differential leverage connection to and controlling said means and actuated by said carriage movements for maintaining the reproducing ratio linear travel of the circumferential surface of the particular rotating work piece in said holder the same as that of said linear movements of said carriage, said leverage connection capable of being adjusted and set for each work piece of different diameter to be engraved.

23. A machine for producing scaled reproduction of copy around the circumference of a roll-like work piece, embodying a rotary holder for receiving and rotating a work piece through a complete revolution with its circumferential surface in operative relation to a cutting tool, said work holder capable of holding and rotating any one of various work pieces of different diameters; a transporting carriage for said rotatable holder, impelled on reproduction ratio linear movements; means transported by said carriage for converting said reproduction ratio linear movements of said carriage into rotary movements of said holder, said means including a holder rotating member concentric therewith and of fixed pitch diameter and a longitudinally elongated member capable of longitudinal movements with respect to said carriage and said first named member, said rotary member capable of movement with the carriage longitudinally of said longitudinal member; and a reproduction ratio compensating differential mechanism actuated by said carriage movements and operatively coupled to said longitudinal member for controlling said relative longitudinal movements of said longitudinal member, said mechanism being capable of adjustment and setting for compensating any difference in diameter between the work piece to be engraved and the pitch diameter of said rotary member.

24. A machine for producing scaled reproduction of copy around the circumferential surface of a work piece whatever the exterior diameter thereof, within limits; embodying a normally relatively-fixed part; a rotary work holder adapted to grasp and rotate through a complete revolution, any one of a series of work pieces of different diameters, on the common longitudinal axial line of the holder and such piece with the circumferential surface of such piece in operative relation to a cutting tool; means actuated by reproduction ratio linear movements for converting such linear movements into rotary movement of such work piece through a complete revolution, said means including a rack and pinion type device operable to rotate said holder by relative movements between a pinion and a rack of such device, said pinion being capable of relative pinion-rotating movements longitudinally of said rack, said rack being capable of various longitudinal movements in either direction during pinion rotation, said rack also adapted to be held against relative longitudinal movement during pinion rotation; and a differential leverage connection actuated by said linear movements and operatively connected to said rack to control its said longitudinal movements and to hold the same against such movements, said leverage connection provided with a normally-fixedly located fulcrum point capable of being shifted and set at various different operative positions; and means for shifting and setting said fulcrum point at any one of said positions.

25. A machine for producing scaled reproduction of copy around the circumferential surface of a work piece whatever the exterior diameter thereof, within limits; embodying a normally relatively-fixed part; a rotary work holder adapted to grasp and rotate through a complete revolution any one of a series of work pieces of different diameters on the common longitudinal axial line of the holder and such piece with the circumferential surface of such piece in operative relation to a cutting tool; a transporting carriage in which said holder is rotatable, said carriage adapted to be impelled on reproduction ratio linear movements; said holder being provided with a rotary member of fixed pitch diameter for rotating said holder; a cooperating longitudinally elongated member mounted on said carriage for causing rotation of said holder through a complete revolution by relative movements between said rotary and longitudinal members impelled by said carriage movements, said rotary member capable of relative holder-rotating movements longitudinally of said longitudinal member, said longitudinal member capable of being held against relative movement in said carriage, and also being capable of various longitudinal relative movements in said carriage during relative rotary member movements longitudinally of said longitudinal member; and a reproduction-ratio compensating differential lever connection operatively coupled to said carriage and actuated by said linear movements thereof, and also operatively coupled to said longitudinal member to hold the same against movements with said carriage and also to relatively impel said member longitudinally in said carriage during said carriage movements, and a normally fixedly located fulcrum point for said connection; and means whereby the operative controlling relative locations of said fulcrum and the points of coupling of said connection to the carriage and to the longitudinal member can be variously shifted and set to compensate for the difference in diameter between the particular work piece to be engraved and the pitch diameter of said rotary member.

26. A machine for producing copy reproductions around the circumference of roll-like work pieces of different diameters, comprising a support; a rotary holder movable on a straight line path, and capable of operatively receiving and rotating any roll-like work piece of a series of such pieces of different diameters, with the circumferential surface of such piece in operative relation to a cutting tool; and a reproduction ratio controlling and actuating transmission for moving said holder on said path through reproduction ratio linear movements while said holder is rotating the work piece held thereby, said transmission including means for converting said holder linear movements into rotary movements of said holder and its work piece, said means provided with a ratio compensating differential mechanism adjustable to set said means according to the diameter of the particular work piece to be operated on to thereby maintain the rotary movements of the work piece at the same reproduction ratio as the linear impelling movements of said holder, said mechanism provided with a visible adjustment guiding scale of different work piece diameter indications from a minimum diameter to a maximum diameter.

27. A machine for producing copy reproductions around the circumferences of roll-like work pieces of different diameters, comprising a support; a rotary holder movable on a straight line path, and capable of operatively receiving and rotating any roll-like work piece of a series of such pieces of different diameters, with the circumferential surface of such piece in operative relation to a cutting tool; and a reproduction ratio controlling and actuating transmission for moving said holder on said path through reproduction ratio linear movements while said holder is rotating the work piece held thereby, said transmission including means for converting said holder linear movements into rotary movements of said holder and its work piece, and a reproducing ratio compensating differential leverage connection having an actuating power point, a fulcrum point, and a work performing point, capable of several operative relative rearrangements to control the reproduction ratio rotary movements of work pieces of different diameters, respectively, and manually controlled means for setting said leverage connection at any one of said rearrangements.

28. A machine for producing scaled copy reproductions around the circumferences of work pieces of different diameters, comprising a support; a work carriage adapted to be impelled on reproduction-ratio linear movements of different lengths determined by the diameter of the particular work piece to be operated on; a rotary work holder mounted in and transported by said carriage, and capable of operatively receiving any one of several work pieces of different diameters, and rotating such piece through a complete revolution with its circumferential surface in operative relation to a cutting tool; and means for converting said linear movements of the carriage into rotary movements of said holder through a complete revolution of the work piece, provided with a controlling differential mechanism operatively associated with the carriage, said support, and said means, and operatively moved by said carriage on its linear movements to control the reproduction-ratio of the linear travel of the circumferential surface of the particular rotating work piece through a complete revolution by the reproduction-ratio of the linear travel of said carriage, stop means being provided cooperating with said mechanism to limit each linear distance traveled by the carriage to impel a complete revolution of the work piece to substantially the linear distance traveled by the circumference of the particular rotating work piece through such revolution.

29. A machine for producing copy reproductions around the circumferential surfaces of roll-like work pieces of different diameters, comprising a support; a work carriage having a path of linear movements; a work holder rotatably mounted in said carriage and capable of operatively holding and rotating any work piece of several pieces of different diameters; and means for converting said linear movements of the carriage into rotary movements of the holder and its work piece including gearing carried by said carriage providing a holder-rotating gear of fixed pitch diameter and a complementary rack, the gear adapted to relatively travel longitudinally of the rack during carriage travel, the rack being mounted in the carriage for relative longitudinal movements during carriage travel and gear rotation, and means for controlling said relative longitudinal movements of said rack.

30. In a machine for engraving around the circumferential surfaces of work pieces of different diameters, in combination; a support; a traveling work carriage; a holder for operatively receiving and rotating any one of a series of roll-like work pieces of different diameters, said holder transported by and rotatably mounted in said carriage; and mechanism for converting movements of the traveling carriage into rotation of said holder, said mechanism including a holder-rotating pinion carried by said carriage, and a cooperating rack carried by and mounted in said carriage for relative movements longitudinally with respect to the rack between the carriage and rack and the pinion and rack during carriage travel, and adjustable means for controlling and varying said relative movements, said means operatively connected into said mechanism and operatively associated with said support and actuated by said carriage travel.

31. In combination, in a machine for engraving around the circumferential surface of work pieces, a relatively-fixed part; a traveling work carriage; a work holder transported by and mounted for rotation in said carriage; and mechanism actuated by the traveling movements of the carriage for rotating said holder, said mechanism including gearing and an actuating rack, a support in said carriage for said rack, said rack being capable of relative longitudinal movements in said carriage on said support, and an adjustable leverage connection between said carriage and said rack and operatively associated with said part for controlling said relative movements.

32. In combination, in a machine for engraving around the circumferential surfaces of work pieces of different diameters, a relatively-fixed part; a traveling work carriage; a work holder mounted in said carriage for rotation on a relatively fixedly located axial line; and mechanism for converting carriage traveling movements into holder rotation, including holder-rotating gearing providing a gearing-actuating rack, said rack mounted in said carriage for relative longitudinal movements; and rack controlling and actuating means operatively associated with said part, and operatively coupled to said carriage and to said rack, and provided with adjusting means for varying said relative movements of the rack.

33. In a machine for the scaled reproduction of copy around the circumferential surfaces of roll-like work pieces of different diameters, in combination, a relatively normally fixed part; a work carriage capable of traveling on work-piece-rotating reproduction-ratio linear movements of various lengths; a work holder for work pieces of different diameters rotatably mounted in said carriage; gearing actuated by said linear movements of the carriage to correspondingly rotate said holder, including a rotary gear of fixed pitch diameter, and a rack capable of relative longitudinal movements, said gear capable of relative movements longitudinally of said rack; and manually adjustable rack controlling and actuating means actuated by said carriage movements and operatively associated with said part.

34. In a machine for the scaled reproduction of copy around the circumferential surfaces of roll-like work pieces of different diameters, in combination, a relatively normally fixed part; a work carriage mounted to travel on work-piece-rotating reproduction-ratio linear movements of different lengths; a work holder for work pieces of different diameters, rotatably mounted in said carriage; mechanism operatively connected with said part, said carriage, and said holder to convert the linear movements of said carriage into rotation of said holder through a complete revolution, said mechanism including a variably adjustable differentially movable member impelled to travel through a path of definite length by each linear travel of the carriage of a length to carry the work piece through a complete revolution, stop means being provided to limit the length of travel of said member and the length of the linear travel of the carriage in either direction to substantially that of the linear length of the circumferential surface of the particular work piece carried through a complete revolution by such carriage travel, said member provided with adjusting means for varying the linear length of a complete work-piece-rotating carriage travel.

35. In a machine for engraving roll-like work pieces, in combination, a normally fixedly located part; a work carriage mounted for linear movements, and embodying a stiff body plate forming the carriage top wall and the carriage base and edge portions, said plate having a transverse upright top bulge forming an open bottom tunnel under the plate; a rotary work holder provided with an exposed work piece chuck above the plate top and a shank rotatably mounted in said tunnel, said plate having a longitudinal upright top bulge forming an open bottom tunnel under the plate intercepting said first named tunnel, and means for converting the linear movements of said carriage into rotary movements of said holder, including a rack and gear device in said tunnels.

GEORGE GORTON.
PETER M. HENKES.
FRED STEINBRECKER.